Aug. 19, 1941.    H. M. ULLSTRAND    2,252,791
REFRIGERATION
Filed March 26, 1938
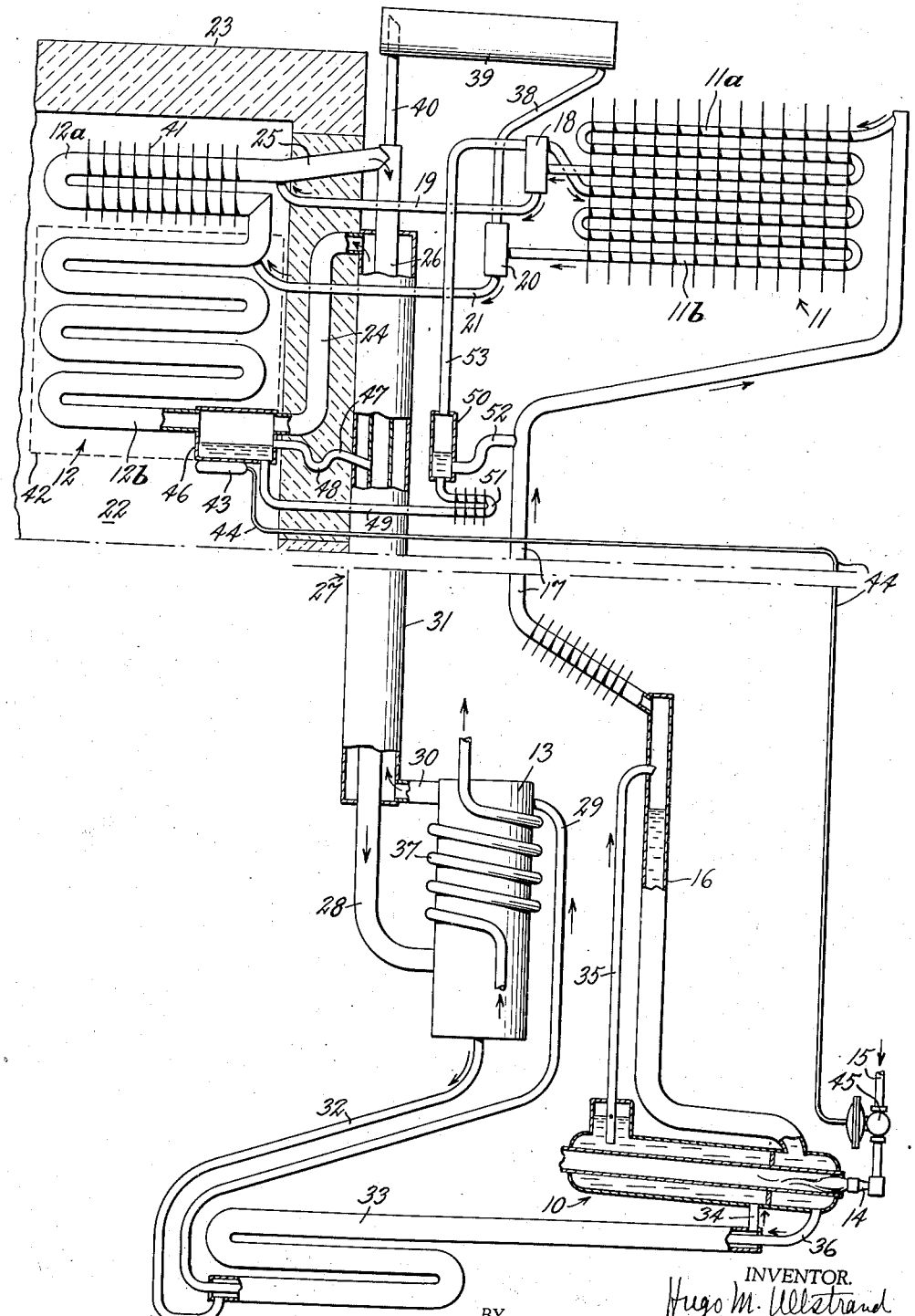
INVENTOR.
Hugo M. Ullstrand
BY
his ATTORNEY.

Patented Aug. 19, 1941

2,252,791

UNITED STATES PATENT OFFICE 2,252,791

REFRIGERATION

Hugo M. Ullstrand, Evansville, Ind., assignor to Servel, Inc., New York, N. Y., a corporation of Delaware Application March 26, 1938, Serial No. 198,161

12 Claims. (Cl. 62—119.5)

My invention relates to refrigeration, and more particularly to a refrigeration system employing evaporation of refrigerant fluid in the presence of an inert gas or auxiliary agent.

It is an object of the invention to provide improved circulation of fluid in refrigeration systems of this type to obtain better use of refrigerating or cooling effect.

The above and other objects and advantages of the invention will be more fully understood upon reference to the following description and the accompanying drawing forming a part of this specification, and in which the single figure illustrates more or less diagrammatically a refrigeration system embodying the invention.

In the drawing I have shown my improvement embodied in a refrigeration system of a uniform pressure absorption type. Such a system includes a generator 10, condenser 11, evaporator 12, and an absorber 13 which are interconnected in a manner well-known in the art and which will briefly be described hereinafter. The system contains a solution of refrigerant in absorption liquid, such as ammonia in water for example, and also an inert gas or auxiliary agent, such as hydrogen.

The generator 10 is heated in any suitable manner, as by a gas burner, for example, to which a suitable combustible gas is delivered through a conduit 15. Due to heating by burner 14, refrigerant vapor is expelled from solution in generator 10. The refrigerant vapor flows upwardly through standpipe 16 and conduit 17 into the air-cooled condenser 11 where the vapor is condensed into liquid.

The condenser 11 includes an upper condenser section 11a and a lower condenser section 11b. Refrigerant liquefied in upper condenser section 11a flows into a gas separating chamber 18 and thence through conduit 19 into evaporator 12. Refrigerant not liquefied in upper condenser section 11a flows from gas separating chamber 18 into the lower condenser section 11b in which it is liquefied. Liquid refrigerant flows from lower condenser section 11b into gas separating chamber 20 and thence through conduit 21 into evaporator 12.

The evaporator 12 is arranged in a space or compartment 22 formed by thermally insulated walls 23. Refrigerant fluid in evaporator 12 evaporates and diffuses into inert gas which enters through a conduit 24, thereby producing a refrigerating or cooling effect with consequent absorption of heat from the surroundings. The rich gas mixture of refrigerant vapor and inert gas formed in evaporator 12 flows from the upper part thereof through a conduit 25, the inner conduit 26 of a gas heat exchanger 27, and conduit 28 into the lower part of absorber 13.

In absorber 13 the rich gas mixture flows counter-current to downwardly flowing weak absorption liquid which enters through a conduit 29. The absorption liquid absorbs refrigerant vapor from the inert gas, and inert gas weak in refrigerant vapor flows from absorber 13 through a conduit 30, outer conduit 31 of gas heat exchanger 27, and conduit 24 into the lower part of evaporator 12.

The circulation of gas in the gas circuit just described is due to the difference in specific weight of the columns of rich and weak gas in the inner and outer conduits 26 and 31, respectively, of gas heat exchanger 27. Since the rich gas is heavier than the weak gas, force is produced for causing flow of rich gas toward absorber 13 and flow of weak gas toward evaporator 12.

Absorption liquid enriched in refrigerant flows from the lower part of absorber 13 through a conduit 32, outer passage of a liquid heat exchanger 33, and conduit 34 into generator 10. Liquid is raised in the generator by a thermo-siphon tube 35 to a higher level than the upper end of conduit 29 and flows back to the generator through stand-pipe 16. Refrigerant vapor expelled out of solution in generator 10, together with refrigerant vapor entering through thermo-siphon tube 35, flows upwardly through stand-pipe 16 and conduit 17 to condenser 11, as explained above.

The absorption liquid from which refrigerant has been expelled flows from generator 10 through conduit 36, inner passage of liquid heat exchanger 33, and conduit 29 to the upper part of absorber 13. This circulation of absorption liquid is effected by raising liquid by means of thermosiphon tube 35. Heat liberated with absorption of refrigerant vapor in absorber 13 is transferred to a cooling medium which flows into a coil 37 arranged in thermal exchange relation with the absorber.

The lower end of condenser 11 is connected by a conduit 38, vessel 39, and conduit 40 to the gas circuit, as at the upper end of gas heat exchanger 27, for example, so that any inert gas which may pass through the condenser can flow into the gas circuit. Refrigerant vapor not liquefied in condenser 11 flows through conduit 38 to displace inert gas in vessel 39 and force gas from the latter through conduit 40 into the gas circuit. By forcing gas into the gas circuit in this manner, the total pressure in the system is raised whereby an adequate condensing pressure is obtained to insure condensation of refrigerant vapor in condenser 11.

The evaporator 12 includes an upper section 12a and a lower section 12b. The evaporator sections are connected in series with inert gas flowing upwardly therethrough in the presence of and in counter-flow to liquid refrigerant which enters through conduits 19 and 21. Since gas weak in refrigerant enters lower evaporator section 12b through conduit 24 and rich gas leaves upper evaporator section 12a through conduit 25, the gas in upper section 12a contains a greater amount of refrigerant vapor than the gas in lower section 12b. The partial vapor pressure of refrigerant in the gas mixture formed in evaporator 12 is a gradient, so that the evaporating temperature of liquid refrigerant is also a gradient, the evaporating temperature of liquid being lower in lower evaporator section 12b.

The upper evaporator section 12a is primarily employed for cooling space 22 and is provided with fins 41, whereby a relatively extensive surface is provided for cooling air flowing over the surfaces thereof.

The lower evaporator section 12b is provided with a limited heat transfer surface and employed as a freezing section for freezing ice cubes and the like. The lower evaporator section 12b is diagrammatically shown in the form of a coil which may be embedded in or otherwise suitably arranged in thermal exchange relation with a shell 42 indicated in dotted lines. Such a shell usually is provided with a plurality of freezing compartments to receive trays for freezing water and other matter to be frozen.

The refrigeration system just described may be controlled by a thermal bulb 43 which is affected by a temperature condition of evaporator 12. As shown, the thermal bulb 43 is arranged in thermal exchange relation with the bottom part of lower evaporator section 12b and connected by a conduit 44 to a control device 45 which is connected in fuel supply conduit 15. The thermal bulb 43 and conduit 44 may form part of an expansible fluid thermostat which is charged with a suitable volatile fluid for operating control device 45 with changes in temperature of lower evaporator section 12b, in a manner well-known in the art.

When the temperature of lower evaporator section 12b increases due to an increase in load on the evaporator, the thermal bulb 43 becomes effective to operate control device 45 to increase the supply of fuel to burner 14 and hence the heat input to generator 10. Under these conditions refrigerant vapor is expelled from solution in generator 10 at an increased rate, thereby increasing the amount of refrigerant vapor which condenses in condenser 11 and flows into evaporator 12. Conversely, when the temperature of lower evaporator section 12b decreases, the thermal bulb 43 becomes effective to operate control device 45 to decrease the supply of fuel to burner 14 and hence reduce the heat input to generator 10. Under these conditions, the rate at which refrigerant vapor is expelled out of solution in generator 10 is reduced, thereby decreasing the amount of refrigerant vapor which condenses in condenser 11 and flows into evaporator 12.

When trays containing water to be frozen are inserted in shell 42 of lower evaporator section 12b, liquid refrigerant may not be reaching the lower part of evaporator section 12b. This may occur, for example, when the freezing load is increased at a time when the room temperature is low and the heat input to the generator 10 is reduced.

Under the above operating conditions which are given by way of example, all of the refrigerant vapor may be condensing in upper condenser section 11a and flowing therefrom through conduit 19 into upper evaporator section 12a and then into lower section 12b. When the freezing load is increased, as by the insertion of trays containing water to be frozen, liquid refrigerant may not be reaching the lower part of evaporator section 12b because liquid is not flowing through conduit 21 and liquid flowing to evaporator 12 is first introduced into upper section 12a. If liquid refrigerant should not be reaching the lower part of lower evaporator section 12b, the thermal bulb 43 would normally become effective to increase the heat input to generator 10, as explained above.

When the heat input to generator 10 is increased with the conditions assumed, the uniform temperature at which it is desired ot keep space 22 is disturbed. Thus, when the room temperature is low and the heat input to generator 10 is reduced, the refrigerating effect produced by evaporator 12 for space cooling may be adequate to keep space 22 at a desired low temperature at the time the freezing load is increased. When the heat input to generator 10 is increased in response to thermal bulb 43, due to lack of liquid in lower evaporator section 12b, more liquid will flow into the evaporator. In addition to supplying liquid to take care of the increased freezing load, additional space cooling will be effected to lower the temperature of space 22 below the desired value.

In accordance with this invention, I propose to better this situation by reducing the flow of liquid refrigerant to upper evaporator section 12a and flowing liquid directly to lower evaporator section 12b when the amount of liquid in the latter is not sufficient to take care of a freezing load. In the drawing I have diagrammatically shown one way of carrying out the invention.

At the lower end of lower evaporator section 12b I provide a vessel 46 into which liquid refrigerant can flow. The vessel 46 may be considered a part of lower evaporator section 12b and may also be embedded in or otherwise suitably arranged in thermal exchange relation with shell 42. To vessel 46 is connected one end of a drain conduit 47 which is bent to provide a liquid trap 48. The other end of conduit 47 is connected to the inner conduit 26 of gas heat exchanger 27, whereby excess liquid may be drained from lower evaporator section 12b. Instead of draining excess liquid directly from the bottom of lower evaporator section 12b in the usual manner, therefore, I provide the vessel 46 in which liquid accumulates to a predetermined level before draining into the gas heat exchanger 27.

To the bottom of vessel 46 is connected one end of a conduit 49 which is connected at its other end to the bottom of a vessel 50. The portion of conduit 49 adjacent vessel 50 is looped at 51 and provided with cooling fins to form an auxiliary condenser. A lower part of vessel 50 is connected by conduit 52 to conduit 17, and an upper part of the vessel is connected by a conduit 53 to the upper part of chamber 18.

The conduit 52, vessel 50, and conduit 53 form a by-pass around upper condenser section 11a whereby refrigerant vapor flowing upwardly from generator 10 can pass directly to lower condenser section 11b. The vessels 46 and 50 and connecting conduit 49 form a liquid trap.

When the amount of liquid accumulated in vessel 46 is such that the level of liquid in vessel 50 is above the connection of conduit 52, the liquid in vessel 50 is effective to seal the by-pass for refrigerant vapor. With these conditions refrigerant vapor flows upwardly through conduit 17 and passes in series through condenser sections 11a and 11b. All of the liquid entering evaporator 12 through conduit 19 flows first into upper evaporator section 12a and then into lower section 12b, while any liquid entering through conduit 21 flows directly into lower section 12b.

When liquid in vessel 46 evaporates and diffuses into inert gas at a faster rate than the rate at which liquid flows into the vessel, the liquid level in vessel 46 will be lowered. This lowering of liquid level may occur when the freezing load is increased, as by the insertion of trays containing water into lower evaporator section 12b. When the liquid level in vessel 46 is lowered so that the liquid level in vessel 50 falls sufficiently to open the liquid seal, refrigerant vapor flowing from generator 10 can flow through conduit 52, vessel 50, conduit 53, and chamber 18 directly into lower condenser section 11b.

With refrigerant vapor flowing in parallel paths of flow through condenser sections 11a and 11b, less refrigerant condenses in upper section 11a and more refrigerant condenses in lower section 11b. The liquid formed in lower condenser section 11b can flow directly into lower evaporator section 12b to take care of the freezing load. Since less refrigerant condenses in upper condenser section 11a under these conditions, less liquid flows to upper evaporator section 12a. With this arrangement, the refrigerating effect produced by lower evaporator section 12b can be increased and that produced by upper evaporator section 12a can be decreased, so that an increase in freezing load can be taken care of without unnecessarily increasing the amount of space cooling effected by evaporator 12.

By providing auxiliary condenser 51, refrigerant vapor is condensed in the liquid trap when operation of the refrigeration system is started, thereby preventing flow of refrigerant vapor from conduit 17 into the lower part of lower evaporator section 12b. During operation of the refrigeration system condenser 51 functions to insure liquid remaining in the liquid trap.

While a single embodiment of the invention has been shown and described, such variations and modifications are contemplated as fall within the true spirit and scope of the invention, as pointed out in the following claims.

What is claimed is:

1. In a refrigeration system, an evaporator, means to flow liquid to said evaporator at different elevations for downward flow through the latter, connections for circulating an auxiliary fluid upwardly through said evaporator and into which liquid evaporates and diffuses, means for receiving liquid and holding such liquid in contact with circulating auxiliary fluid, and means responsive to level of liquid in said receiving means to vary the relative amount of liquid flowing to said evaporator at said different elevations.

2. In an absorption refrigeration system, containing auxiliary fluid, refrigerant fluid and an absorbent, a plurality of places of condensation, connections for flowing refrigerant fluid through said places of condensation including means for flowing refrigerant fluid selectively in series or in parallel through said places of condensation.

3. In a refrigeration system, an evaporator including upper and lower sections connected in series, a plurality of condenser sections, connections for flowing vaporous refrigerant fluid in series through said condenser sections and flowing liquid refrigerant fluid from each of said condenser sections to one of said evaporator sections, a by-pass connection for vaporous refrigerant fluid around said condenser section from which liquid refrigerant fluid flows to said upper evaporator section, and means for controlling said by-pass connection.

4. In a refrigeration system, an evaporator including upper and lower sections connected in series, a plurality of condenser sections, connections for flowing vaporous refrigerant fluid in series through said condenser sections and flowing liquid refrigerant fluid from each of said condenser sections to one of said evaporator sections, connections for circulating an inert gas through said evaporator into which liquid refrigerant evaporates and diffuses, means for receiving liquid refrigerant and holding such liquid in contact with circulating inert gas, a by-pass connection for vaporous refrigerant fluid around said condenser section from which liquid refrigerant fluid flows to said upper evaporator section, and means responsive to level of liquid in said receiving means for controlling said by-pass connection.

5. In a refrigeration system, an evaporator, means to flow liquid refrigerant to different portions of said evaporator, connections for circulating an inert gas through said evaporator into which liquid evaporates and diffuses, means for receiving liquid refrigerant and holding such liquid in contact with circulating inert gas, and means responsive to level of liquid in said receiving means to vary the relative amount of liquid flowing to different portions of said evaporator.

6. In an absorption refrigeration system containing auxiliary fluid, refrigerant fluid and an absorbent, an evaporator, means to supply liquid refrigerant fluid to said evaporator including a plurality of places of condensation connected for flow of refrigerant fluid therethrough in series, a by-pass for refrigerant fluid shunting at least a part of one of said places of condensation, and means to open and close said by-pass with respect to flow of refrigerant fluid therethrough.

7. In a refrigeration system, an evaporator, means to supply liquid refrigerant to said evaporator including a plurality of places of condensation connected for flow of refrigerant fluid therethrough in series, connections for circulating an auxiliary fluid through said evaporator into which liquid refrigerant evaporates and diffuses, a by-pass for refrigerant fluid shunting at least a part of one of said places of condensation, and means responsive to rise and fall of liquid to open and close said by-pass with respect to flow of refrigerant fluid therethrough.

8. In a refrigeration system, an evaporator, means to supply liquid refrigerant fluid to different portions of said evaporator including a plurality of condenser sections, connections for circulation of auxiliary fluid through said evaporator, a chamber for holding liquid refrigerant in contact with auxiliary fluid, and means for changing the rate of circulation of refrigerant fluid in said condenser sections with changes of liquid level in said chamber due to the difference in the rates at which liquid flows into and evaporates in said chamber.

9. In a refrigeration system, an evaporator and a plurality of condenser sections, connections for flowing vaporous refrigerant fluid to said condenser sections and liquid refrigerant fluid from the latter to different portions of said evaporator, connections for circulating an auxiliary fluid through said evaporator into which liquid refrigerant evaporates and diffuses, a chamber connected to said evaporator for holding liquid refrigerant in contact with auxiliary fluid, and means for changing the rate of flow of refrigerant fluid in said condenser sections with changes of liquid level in said chamber.

10. A method of refrigeration with the aid of a system in which liquid refrigerant in an evaporator evaporates in the presence of and diffuses into an inert gas, that improvement which consists in flowing refrigerant fluid in a plurality of streams to a corresponding plurality of parts of said evaporator, accumulating liquid refrigerant at a place of accumulation in said system, and diverting refrigerant fluid away from one of said streams to another responsive to change in the amount of liquid in said place of accumulation.

11. A method of refrigeration which includes flowing refrigerant fluid in liquid form into the presence of auxiliary fluid at a plurality of places, supplying said liquid refrigerant by condensing vaporous refrigerant fluid to liquid at a place of condensation and dividing the liquid for flow to said places of evaporation in accordance with amounts of condensate formed in different parts of said place of condensation, and selectively flowing the vaporous refrigerant fluid to said place of condensation in a single stream or in a plurality of streams to said different parts of said place of condensation responsive to change in a condition in one of said places of evaporation.

12. A method of refrigeration as set forth in claim 11, in which said auxiliary fluid is caused to flow from one of said places of evaporation to another so that said one place of evaporation is at a lower temperature than the other, and said condition is the demand for refrigeration at said low temperature place of evaporation.

HUGO M. ULLSTRAND.